(12) United States Patent
Koenig et al.

(10) Patent No.: US 11,342,875 B2
(45) Date of Patent: May 24, 2022

(54) ELECTRIC MOTORS WITH NEUTRAL VOLTAGE SENSING

(71) Applicant: Hamilton Sundstrand Corporation, Charlotte, NC (US)

(72) Inventors: Andreas C. Koenig, Rockford, IL (US); Joseph Kenneth Coldwate, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 394 days.

(21) Appl. No.: 15/484,814

(22) Filed: Apr. 11, 2017

(65) Prior Publication Data

US 2018/0294760 A1    Oct. 11, 2018

(51) Int. Cl.
| | |
|---|---|
| H02P 27/06 | (2006.01) |
| H02K 11/26 | (2016.01) |
| H02P 9/14 | (2006.01) |
| B64D 13/02 | (2006.01) |
| B64D 27/18 | (2006.01) |
| H02P 25/16 | (2006.01) |
| H02P 29/024 | (2016.01) |

(52) U.S. Cl.
CPC .............. *H02P 27/06* (2013.01); *B64D 13/02* (2013.01); *B64D 27/18* (2013.01); *H02K 11/26* (2016.01); *H02P 9/14* (2013.01); *H02P 25/16* (2013.01); *H02P 29/0241* (2016.02); *B64D 2221/00* (2013.01)

(58) Field of Classification Search
USPC .... 318/445, 549, 42, 122, 250, 400.01, 724, 318/748
See application file for complete search history.

(56) References Cited

U.S. PATENT DOCUMENTS

| | | | | |
|---|---|---|---|---|
| 5,616,994 A | * | 4/1997 | Nagaoka .................. | H02P 6/06 318/400.04 |
| 8,816,694 B2 | * | 8/2014 | Obata .................... | G01R 31/06 324/536 |
| 8,830,039 B1 | * | 9/2014 | Egan ....................... | B60L 53/14 340/12.32 |
| 2006/0022679 A1 | * | 2/2006 | Obata .................. | G01R 31/346 324/551 |
| 2014/0117912 A1 | * | 5/2014 | Gajic ................... | G01R 31/343 318/490 |
| 2014/0132197 A1 | | 5/2014 | Kanazawa et al. | |

(Continued)

FOREIGN PATENT DOCUMENTS

| | | | |
|---|---|---|---|
| KR | 100823723 B1 | 4/2008 | |
| WO | WO-2016178667 A1 * | 11/2016 | ........... H02H 7/0822 |

OTHER PUBLICATIONS

Extended European search report for European Patent Application No. 18166829.4, dated Aug. 31, 2018.

*Primary Examiner* — Jorge L Carrasquillo
(74) *Attorney, Agent, or Firm* — Locke Lord LLP; Scott D. Wofsy; Judy R. Naamat (57) ABSTRACT

An electrical machine includes a with a parallel first and second phase windings. A first neutral bus is connected to the first phase winding and a second neutral bus is connected to the second phase winding. A first voltage sensor is coupled to the first neutral bus and a second voltage sensor coupled to the second phase winding for monitoring current imbalance between the first and second phase windings.

20 Claims, 4 Drawing Sheets

(56) References Cited

U.S. PATENT DOCUMENTS

| | | | | |
|---|---|---|---|---|
| 2014/0346986 A1* | 11/2014 | Warr | ......................... | H02P 6/12 |
| | | | | 318/400.21 |
| 2016/0276825 A1* | 9/2016 | Abdel-baqi | ......... | H02P 29/0241 |
| 2017/0175748 A1* | 6/2017 | Pal | ........................ | F04D 29/584 |
| 2017/0363088 A1* | 12/2017 | Nguyen | ................ | E21B 43/128 |
| 2018/0254735 A1* | 9/2018 | Koenig | ............... | H02P 29/0243 |

* cited by examiner

ELECTRIC MOTORS WITH NEUTRAL VOLTAGE SENSING

BACKGROUND OF THE INVENTION

1. Field of the Invention

The present disclosure relates electric motors, and more particularly to monitoring current imbalance in parallel windings of electric motors.

2. Description of Related Art

Electrical systems, such as in aircraft, commonly utilize electric motors to provide mechanical power to various systems. In some electric motors it can be desirable to have windings tied in parallel with one another between a motor feed and neutral terminals within the motor. Such parallel windings can provide reduced electrical losses from winding resistance and inductance, and efficient operation at high electrical frequencies. The parallel windings generally tie together within the motor such that a single feed for each motor phase connects to externally to a power source, which is typically through an overcurrent protection device like a circuit breaker or fuse.

Occasionally one of the parallel windings within the motor can exhibit increased resistance, may become open or short. The increased resistance or electrically open state of the parallel winding can cause current provided by the phase lead to be shunted through the remaining parallel winding, which accepts the current potentially experiences overcurrent stress from the additional current. The additional current accepted by the remaining parallel winding(s) can cause overheating in the remaining parallel winding(s), potentially reducing motor reliability.

Such conventional methods and systems have generally been considered satisfactory for their intended purpose. However, there is still a need in the art for improved motor arrangements and methods monitoring current balance in motor arrangements. The present disclosure provides a solution for this need.

SUMMARY OF THE INVENTION

An electrical machine includes a with a parallel first and second phase windings. A first neutral bus is connected to the first phase winding and a second neutral bus is connected to the second phase winding. A first voltage sensor is coupled to the first neutral bus and a second voltage sensor coupled to the second phase winding for monitoring current imbalance between the parallel first and second windings.

In certain embodiments, an inverter can be connected to the parallel first and second windings. A controller can be operably connected to the inverter and disposed in communication with the first and second voltage sensors. The controller can be configured to de-rate or cease application of power to the parallel motors based on current imbalance between the parallel first and second windings. The electrical machine can be dual phase or a three-phase AC power electrical machine. The electrical machine can be a motor electrical machine, a generator electrical machine, or a motor/generator electrical machine. A phase lead can connect the inverter to the first and second windings.

In accordance with certain embodiments, the first and second phase windings can be A-phase first and second windings, and the motor can include parallel B-phase first and second windings. The B-phase first winding can be connected to the first neutral bus. The B-phase second winding can be connected to the second neutral bus. The motor can include parallel C-phase first and second windings. The C-phase first winding can be connected to the first neutral bus. The C-phase second winding can be connected to the second neutral bus.

It is also contemplated that, in accordance with certain embodiments, a sensor lead can be connected to the first voltage sensor. The sensor lead can have a conductor with a wire gauge size that is smaller than a wire gauge size of the phase lead. The sensor lead can be a first sensor lead and a second sensor lead can be connected to the second voltage sensor.

A motor arrangement includes an electrical machine as described above. An inverter is connected to the first and second windings. A motor controller is operably connected to the inverter and is communicative with the first and second voltage sensors to control power applied to the motor based on current imbalance between first and second windings. In certain embodiments, the motor can be connected to a cabin air compressor or a nitrogen generation system. In accordance with certain embodiments, a phase lead can be connected to the first and second windings and a sensor lead can be connected to the first voltage sensor, the sensor lead having a wire gauge size that is smaller than the wire gauge size of the phase lead.

A method of monitoring current imbalance in an electrical machine includes applying power to parallel first and second phase windings in a stator. Voltage is sensed in a first neutral bus connected to the first winding and in a second neutral bus connected to the second winding. The voltage sensed in the second winding is compared to the voltage sensed in the first winding, and current imbalance between current flowing through the first and second phase windings is determined. In certain embodiments the power applied to the first and second windings can be alternating current with a common phase. In accordance with certain embodiments, comparing the first voltage to the second voltage can include comparing a difference between the voltages to a selected value. The electrical machine can be de-rated or the power removed from the windings based of the comparison of the first and second windings.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
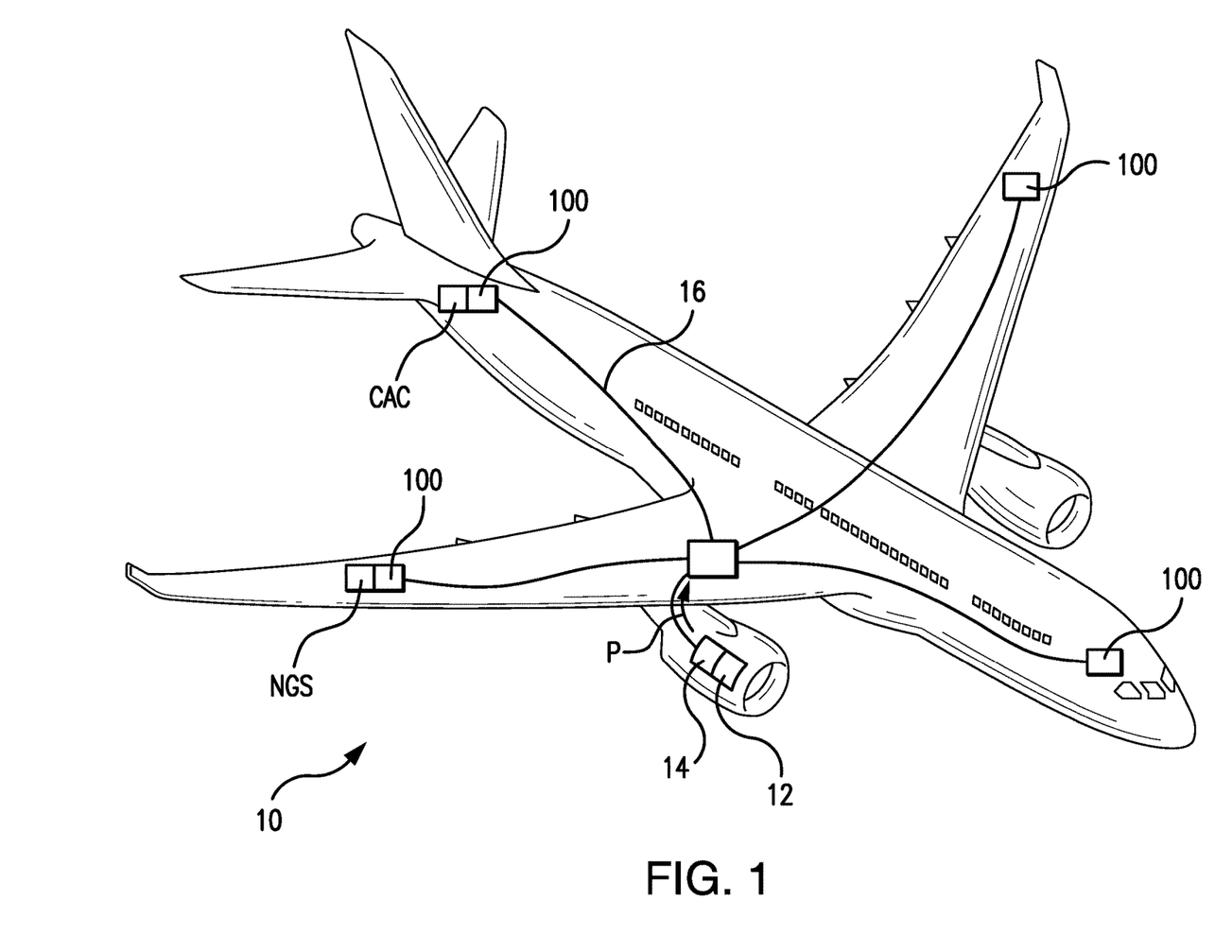
FIG. 1 is a schematic view of an exemplary embodiment of a electrical machine arrangement constructed in accordance with the present disclosure, showing an electrical machine connected to a cabin air conditioner or nitrogen generation system in an aircraft.

Reference will now be made to the drawings wherein like reference numerals identify similar structural features or aspects of the subject disclosure. For purposes of explanation and illustration, and not limitation, a partial view of an exemplary embodiment of an electrical machine arrangement in accordance with the disclosure is shown in FIG. 1 and is designated generally by reference character 100. Other embodiments of electrical machine arrangements, motors and methods of monitoring current imbalance in electric machines with parallel windings in accordance with the disclosure, or aspects thereof, are provided in FIGS. 2-4, as will be described. The systems and methods described herein can be used monitoring motor health, such as in motors for cabin air conditioning (CAC) and nitrogen generation systems (NGS), though the present disclosure is not limited to CAC and NGS systems, motors, or to aircraft mechanical systems in general.

Referring to FIG. 1, an aircraft 10 is shown. Aircraft 10 includes an engine 12, a generator 14, a power distribution system 16, and an electrical machine arrangement 100, e.g., a motor arrangement. Engine 12 is operably connected to generator 14. Generator 14 is arranged to generate electrical power P using mechanical power received from engine 12. In the illustrated exemplary embodiments power P is provided by motor electrical machine arrangement 100, which is connected generator 14 by power distribution system 16. Motor electrical machine arrangement 100 is operatively connected to one or more mechanical loads, such as a CAC or NGS, and is arranged to provide mechanical power to the respective attached mechanical load. Although a CAC or NGS is shown it is to be understood and appreciated that motor electrical machine arrangement 100 can used in conjunction with any suitable load. Further, although the electrical machine arrangement is described herein as a motor arrangement, it is to be understood and appreciated that the present disclosure can also be used in generator and motor/generator arrangements.

Figure 2:
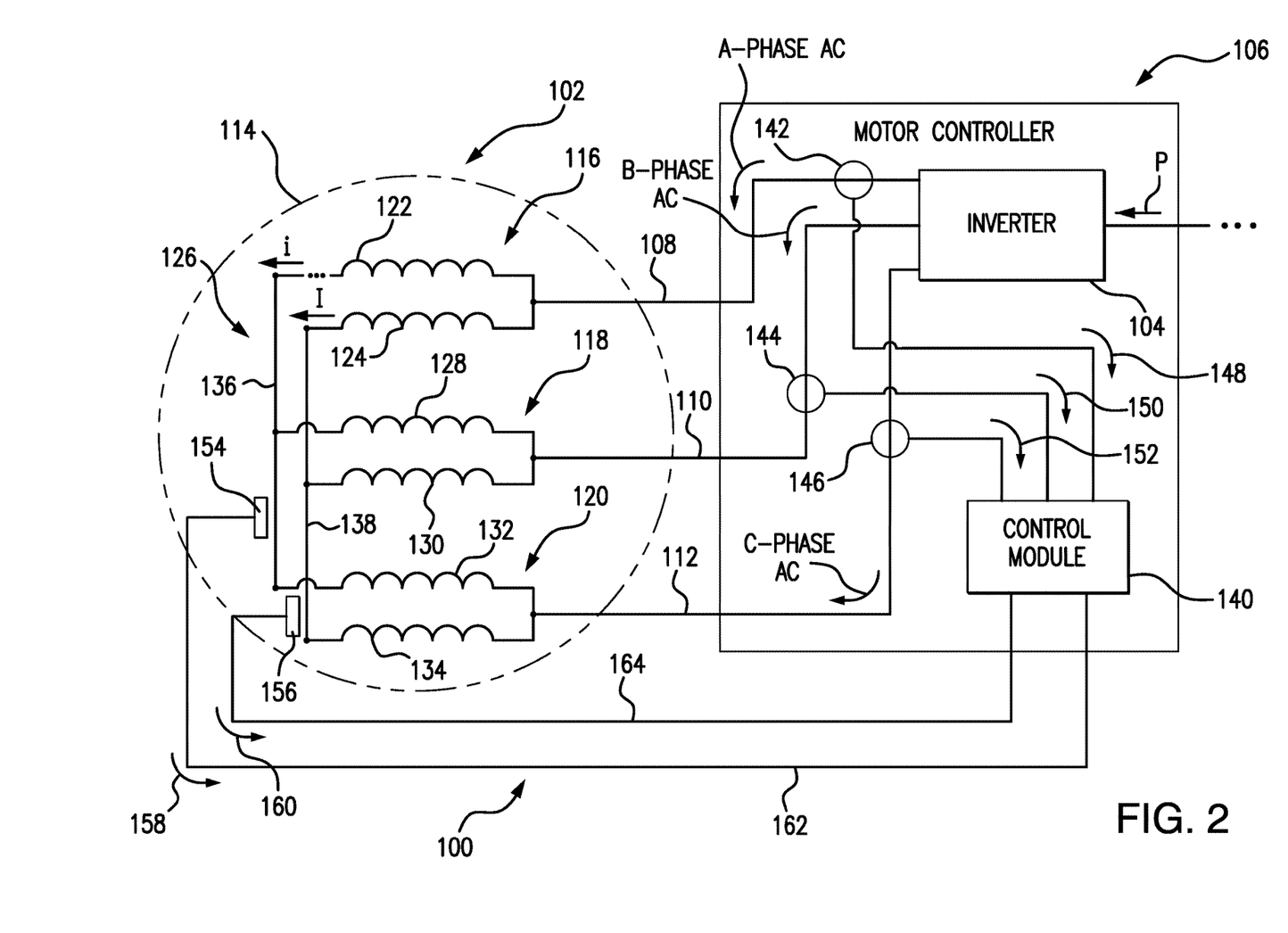
FIG. 2 is a schematic view of the electrical machine arrangement of FIG. 1, showing a controller connected to the motor and disposed is communication with the voltage sensors arranged within the electrical machine.

With reference to FIG. 2, motor arrangement 100 is shown. Motor arrangement 100 includes a motor 102, an inverter 104, and a motor controller 106. Motor 102 is an alternating current (AC) power motor, such as a single-phase or polyphase AC power motor. Inverter 104 is connected to generator 14 (shown in FIG. 1), receives power P from generator 14 (shown in FIG. 1), and converts power P into AC power, which inverter 104 provides to motor 102 through an A-phase lead 108, a B-phase lead 110 and a C-phase lead 112.

Motor 102 has a stator 114 and includes one or more winding sets, e.g., an A-phase winding set 116, a B-phase winding set 118, and a C-phase winding set 120. A-phase winding set 116 has an A-phase first winding 122 and an A-phase second winding 124 that are seated in stator 114 and connected electrically in parallel with one another between A-phase lead 108 and a neutral terminal 126. B-phase winding set 118 has a B-phase first winding 128 and a B-phase second winding 130 that are seated in stator 114 and connected electrically in parallel with one another between B-phase lead 110 and neutral terminal 126. C-phase winding set 120 has a C-phase first winding 132 and a C-phase second winding 134 seated in stator 114 and connected in parallel with one another between C-phase lead 112 and neutral terminal 126.

Neutral terminal 126 includes a first neutral bus 136 and a second neutral bus 138. First neutral bus 136 and second neutral bus 138 are seated in stator 114. A-phase first winding 122, B-phase first winding 128 and C-phase first winding 130 are connected to first neutral bus 136 on an end opposite A-phase lead 108, B-phase lead 110 or C-phase lead 112, respectively. A-phase second winding 124, B-phase second winding 128 and C-phase second winding 132 are connected to second neutral bus 138 on an end opposite A-phase lead 108, B-phase lead 110 or C-phase lead 112, respectively. As will be appreciated by those of skill in the art in view of the present disclosure, tying winding sets in parallel with one another reduces winding resistance and inductance to reduce electrical losses, and improves operation at high electrical frequencies.

Motor controller 106 is connected to inverter 104 for controlling AC power applied motor 102 by inverter 104 through A-phase lead 108, a B-phase lead 110 and a C-phase lead 112. In this respect motor controller 106 has a control module 140 which is operably connected to inverter 104 and which is disposed in communication with one or more phase current sensors, e.g., an A-phase current sensor 142, a B-phase current sensor 144, and/or a C-phase current sensor 146. A-phase current sensor 142 is coupled to A-phase lead 108 for providing an A-phase current signal 148 to control module 140, B-phase current sensor 144 is coupled to B-phase lead 110 for providing a B-phase current signal 150 to control module 140, and C-phase current sensor 146 is coupled to C-phase lead 112 for providing a C-phase current signal 152 to control module 140. The coupling of each sensor is external to motor 102, e.g., within motor controller 106.

Motor controller 106 controls AC power applied to motor 102 at least in part based upon total phase current balance. In this respect control module 140 compares A-phase current signal 148 with B-phase current signal 150 and C-phase current signal 152, and ceases operation of motor 102 based upon the amount of total phase current imbalance within the phases. As will be appreciated by those of skill in the art in view of the present disclosure, the phase current signals conveying A-phase current signal 148, B-phase current signal 150, and C-phase current signal 152 are acquired from outside of motor 102 the respective phase lead. Current imbalance between parallel windings in a given phase winding set can therefore be masked in the event that a high resistance connection or open develops within stator 114. This is because one of the parallel first and second windings can accept additional current in the event that the other of the parallel first and second windings becomes high resistance or fails open, potentially exposing the remaining parallel and otherwise undamaged winding to an overcurrent condition. Imbalance is illustrated in FIG. 2 in an exemplary way with a dotted segment shown in A-phase first winding 122, where a loose connection or open increases resistance forces A-phase second winding 124 to accept a greater amount of current provided to winding set 108 than flows through A-phase first winding 122.

To prevent overcurrent in a given winding, e.g., within A-phase first winding 122, motor 102 includes a first voltage sensor 154 and a second voltage sensor 156. First voltage sensor 154 is seated in stator 114 and is coupled to first neutral bus 136 to sense voltage in first neutral bus 136, which first voltage sensor 158 provides to control module 140 as a first voltage signal 158. Second voltage sensor 156 is also seated in stator 114 and is communicative with second neutral bus 138 to sense voltage in second neutral bus 138, which second voltage sensor 156 provides to control module 140 as a second voltage signal 160. First voltage signal 158 is provided to control module 140 through a first sensor lead 162, which extends between motor 102 and motor controller 106, and second voltage signal 160 is provided to control module 140 through a second sensor lead 164, which also extends between motor 102 and motor controller 106.

Based on first voltage signal 158 and second voltage signal 160, control module 140 calculates a differential between voltages in first neutral bus 136 and second neutral bus 138. During normal operation, e.g., when resistances among individual windings within a given winding set are equivalent, the calculated voltage differential is low, e.g., at zero volts. However, in the event that a winding of a given winding set has high resistance (such as from a loose connection) or is open circuit the differential would be high. Control module 140 is configured to calculate the differential voltage between the first neutral bus 126 and second neutral bus 128, compare the differential to a selected value, and change current flow to motor 102 according when the differential exceeds the selected value. This allows for accurate sensing of winding failure in parallel three-phase wound electric machines such as motor 102, allowing for rapid tripping to offline and shutdown. It can also provide for fault sensing with relatively few parts and a lightweight sensing arrangement.

Figure 3:
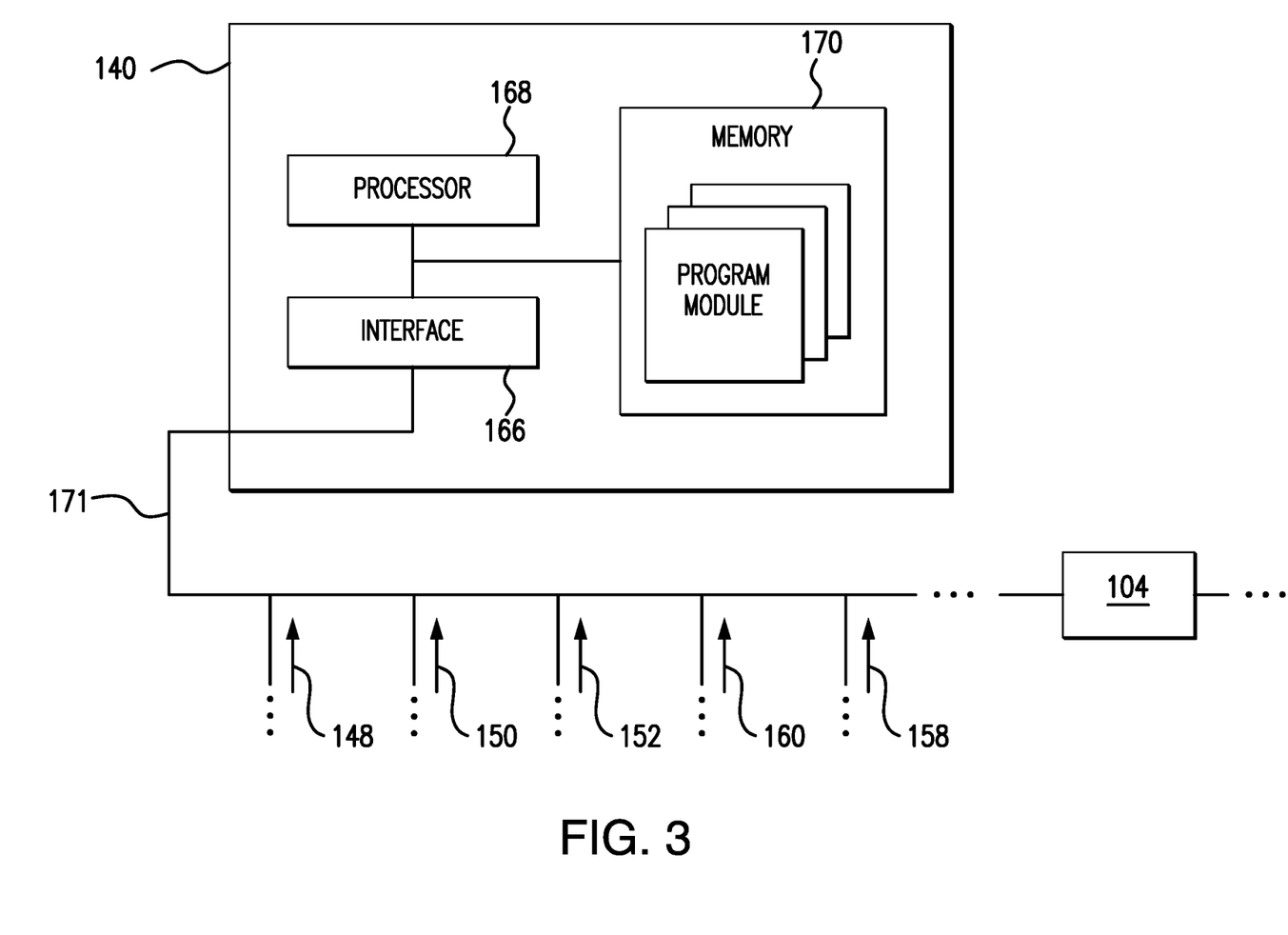
FIG. 3 is a schematic view of the motor controller of FIG. 2, showing a controller control module connected to an inverter and disposed in communication with voltage sensors arranged within the electrical machine.

With reference to FIG. 3, control module 140 is shown according to an exemplary implementation. Control module 140 is operatively connected to inverter 104 and is arranged to control AC power applied to each of the phase leads, e.g., A-phase lead 108 (shown in FIG. 2), B-phase lead 110 (shown in FIG. 2), and C-phase lead 112 (shown in FIG. 2), according to current imbalance between parallel phase windings connected to the respective phase lead. Current imbalance between windings of parallel winding sets is determined based on voltage differential between first neutral bus 136 and second neutral bus 138 within neutral terminal 126, e.g., calculating the difference between first neutral bus voltage and second neutral bus voltage by subtracting first neutral bus voltage signal 158 from second neutral bus voltage signal 156. Determining current imbalance can also include receiving signals indicative of current flow for one or more the phases of motor 102 (shown in FIG. 2), e.g., A-phase current signal 148, B-phase current signal 150, and/or C-phase current signal 152.

In the illustrated exemplary embodiment control module 140 includes an interface 166, a processor 168, a memory 170 and a link 171. Memory 170 includes a non-transitory machine-readable medium having a plurality of program modules 172 recorded thereon that, when read by processor 168, cause processor 168 to execute certain operations, e.g., a method 200 (shown in FIG. 4) of monitoring current imbalance in parallel windings of an electric motor. Processor 168 is disposed in communication with memory 170. Processor 168 is also disposed in communication via link 171 with first voltage sensor 154 (shown in FIG. 2) through first sensor lead 162 (shown in in FIG. 2) to receive therefrom first voltage signal 158. Processor is also disposed in communication via link 171 with second voltage sensor 156 (shown in FIG. 2) through second sensor lead 164 (shown in FIG. 2) to receive therefrom second voltage signal 160. Communication with the current sensors can be with a similar arrangement. Although control module 140 is illustrated as having a processor 168 disposed in communication with memory 170 in the illustrated exemplary embodiment, it is to be understood and appreciated that control module 140 can be implemented as circuitry, software, or a combination of both circuitry and software, as suitable for an intended application.

Figure 4:
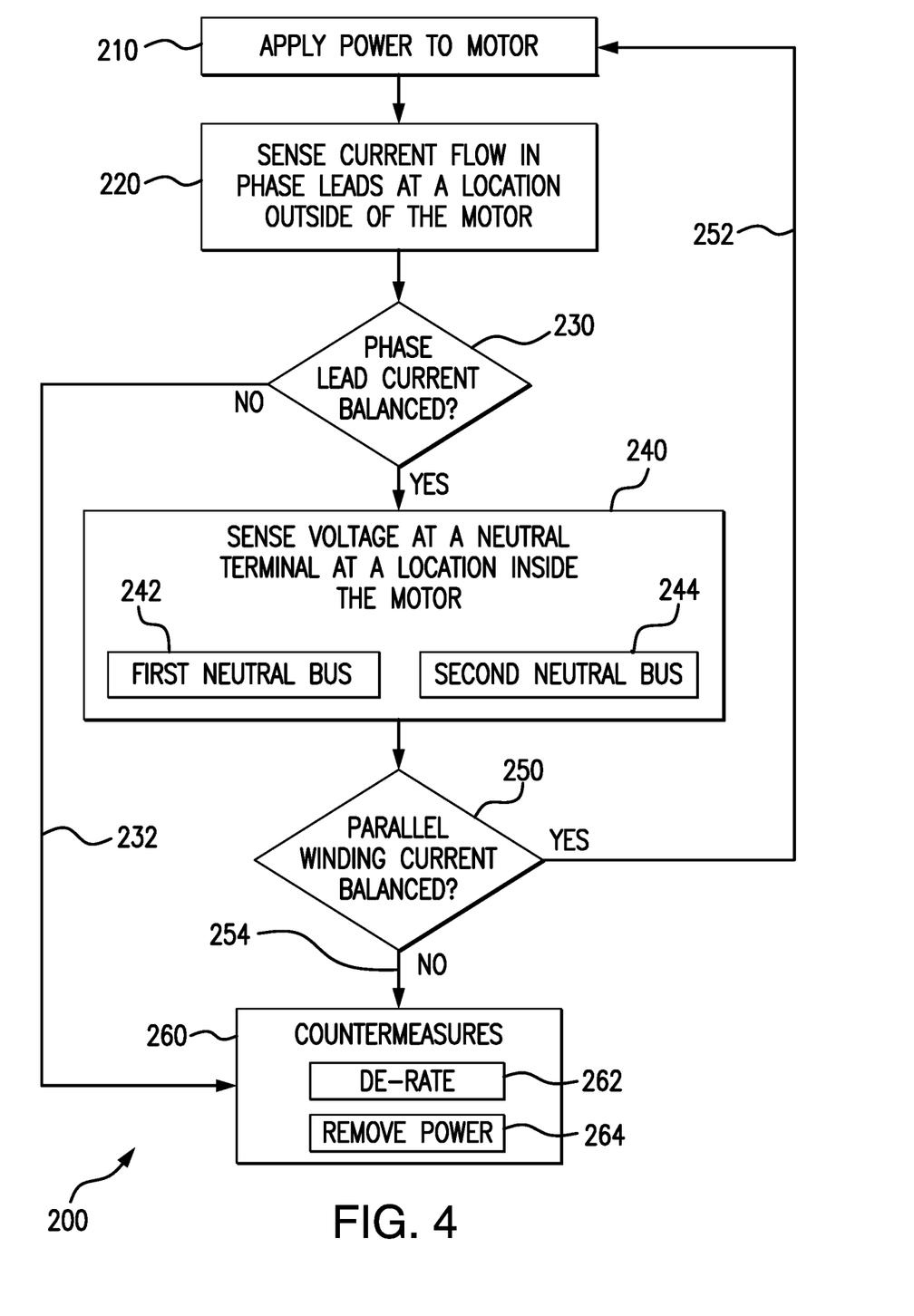
FIG. 4 is a process flow diagram of a method of monitoring current imbalance in an electrical machine, showing steps of the method.

With reference to FIG. 4, method 200 of monitoring current imbalance in a motor, e.g., motor 102 (shown in FIG. 2), is shown. Method 200 includes applying power, e.g., AC power P (shown in FIG. 1), to the motor, as shown with box 210. Applying power can include applying the power to one or more phase lead, e.g., A-phase lead 108 (shown in FIG. 2), connected to the motor. Applying power to the motor can also include applying power to parallel first and second windings of a winding set, e.g. A-phase first winding 122 (shown in FIG. 2) and A-phase second winding 124 (shown in FIG. 2).

As power is applied to the phase leads a determination is made as to the balance of current flowing to the motor between phase leads connected to the motor, as shown with box 220. The determination can be made using current flow sensed in phase leads of the motor at a location outside of the motor, e.g., at through A-phase lead 108 (shown in FIG. 2) using A-phase current sensor 142 (shown in FIG. 2) and B-phase lead 110 (shown in FIG. 2) using B-phase current sensor 144 (shown in FIG. 2), as shown with box 220. A determination is made as to whether total phase current flow is balanced between the phases leads, as shown with box 230, such as by comparing total phase current imbalance against a selected total phase current imbalance value. When total phase current flow imbalance exceeds the selected total phase current imbalance value countermeasures 260 are taken, as shown with arrow 232.

When total phase current imbalance is below the selected total phase current imbalance value a determination is made as to balance imbalance within a given phase and between parallel windings of a motor set, e.g., within A-phase winding set 116 (shown in FIG. 2), as shown with box 250. This is done within the motor, e.g., within motor stator 114. The determination can be made using voltage sensed at a neutral terminal located within the motor, e.g., neutral terminal 126 (shown in FIG. 2), as shown with box 240. In certain embodiments the determination is made using voltage sensed at a first neutral bus, e.g., first neutral bus 136 (shown in FIG. 2), as shown with box 242, and voltage sensed at a second neutral bus, e.g., second neutral bus 138 (shown in FIG. 2), as shown with box 244. The voltage measurement from one of the neutral terminals is compared to the voltage measurement from the other of the neutral terminals, a voltage difference calculated, and the voltage difference compared to the selected imbalance value, e.g., a reference recorded on memory 170 (shown in FIG. 3).

If the calculated voltage difference is above the selected imbalance value then no change is made to the operation of the motor, as shown with arrow 252. If the calculated voltage difference is greater than below the selected imbalance value, then countermeasures are taken, as shown with arrow 254 and box 260. For example, the motor can be de-rated by reducing AC power applied to each of the phases, e.g., box 262.

It is also contemplated that power applied to a given winding set can be removed entirely, as shown with box 264. Power can be removed from a subset of the windings, such as by removing AC power from each of the motor phases in sequence while monitoring imbalance, associating a change in imbalance with the phase powered off at the time the imbalance changes, and removing power from the associated phase until such time as the motor can be serviced. De-rating the motor or removing power from one or more phases of the motor allows for continued operation of the load coupled to the motor, e.g., CAC or NGS (shown in FIG. 1), in a limited mode while reducing the risk of damage to the motor.

For some types of three-phase driven electrical motors it is desirable to have two three-phase sets of windings tied in parallel with one another. Reasons for winding sets tied in parallel can be for reducing winding resistance and inductance to reduce electrical losses and improve operation at high electrical frequencies. It is common in this type of design to join the two parallel winding sets in the motor and have only three leads exit the motor. The motor leads in turn connect the motor to the motor controller, which senses current in the three leads using current sensors, measures current flow in each of the phases, and applies a control algorithm to ensure that the current is approximately balanced in each of the three phase windings.

Occasionally one of the windings in the motor may fail, potentially leading to the current in the three phases to become unbalanced. In this case the motor controller would recognize the unbalance and stop operating the motor, such as by tripping to take the motor offline.

In some cases with a winding failure current can remain sufficiently balanced such that motor controller continues operating the motor at lower power levels without tripping offline. This can occur, for example, because the undamaged leg of the parallel windings accepts additional current to compensate for the damaged parallel phase. This partially masks the failure such that the motor controller may not detect the failure and causes losses in the remaining parallel path to remain high due to the additional current, potentially reducing the life of the undamaged leg of the parallel windings. For example, during normal operation current flow through the A-phase winding set is split approximately evenly between parallel first and second windings. However, if resistance increases in one of the windings, the other parallel winding may accept additional current above that expected for the operating condition, potentially giving resulting in overcurrent damage to the winding.

In embodiments described herein motor arrangements are described with current balance sensing. In certain embodiments a sensor lead is brought from each of the motor neutrals to the motor controller. In accordance with certain embodiments the sensor lead is arranged to carry relatively small amounts of current and is therefore small gauge, for example having a gauge size that is smaller than that of the phase leads. Separate sensor leads can couple the motor controller to each neutral bus of the motor.

It is contemplated that the motor controller can determine differential voltage between the neutrals in the motor. For example, under normal conditions the neutrals of each winding set should be at the voltage potential. However, in the event that a winding of a given phase has increased in resistance or is open a differential voltage will be present, which the motor controller detects by comparison of the voltage differential. It is also contemplated that the motor controller can be configured to recognize voltage differentials and take appropriate countermeasures in the event current unbalance. Examples of countermeasures include de-rating or removing power from a given phase to reduce the risk of motor damage from current overload. Countermeasures can also include removal of power from the motor entirely.

The methods and systems of the present disclosure, as described above and shown in the drawings, provide for electric machines with superior properties including the capability to detect resistance change in a phase winding that could otherwise lead to current overload in the parallel winding phase winding. In certain embodiments the methods and systems of the present disclosure can provide more accurate sensing of winding failure in parallel three-phase wound machines. Reduced weight and parts count fault sensing can also be provided. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An electrical machine, comprising:
   a stator of a motor with first and second A-phase windings electrically connected in parallel at a first end of the first and second A-phase windings to an inverter by an A-phase lead and first and second B-phase windings electrically connected in parallel at a first end of the first and second B-phase windings to the inverter by a B-phase lead, an A-phase current sensor sensing current along the A-phase lead and a B-phase current sensor sensing current along the B-phase lead;
   a first neutral bus within the stator connected to the first A-phase winding at a second end of the first A-phase winding and further connected to the first B-phase winding at a second end of the first B-phase winding, the first neutral bus having a first voltage sensor configured to sense a first voltage;
   a second neutral bus within the stator connected to the second A-phase winding at a second end of the second A-phase windings and further connected to the second B-phase winding at a second end of the second B-phase winding, the second neutral bus having a second voltage sensor configured to sense a second voltage; and
   a controller coupled to each of the A-phase and B-phase leads and to each of the first and second voltage sensors, the controller configured to:
      monitor a total current phase flow for imbalance based on a comparison of the currents measured in the A-phase and B-phase leads to a total phase current imbalance value;
      when the total current phase flow is determined to be balanced, determining whether there is an imbalance of current phase flow per phase based on a comparison of a differential between the first and second voltages during operation of the stator and a voltage imbalance value; and
      taking countermeasures for operation of the stator based on a determination that there is an imbalance of the total current phase flow or an imbalance of the current phase flow per phase, wherein the countermeasures include de-rating or removing power applied to one or more of the of the A-phase and B-phase leads.

2. The electrical machine as recited in claim 1, wherein the A-phase current sensor senses a current along the A-phase lead outside of the motor and the B-phase current sensor senses a current along the B-phase lead outside of the motor.

3. The electrical machine as recited in claim 1, further comprising the inverter.

4. The electrical machine as recited in claim 1, further comprising parallel first and second C-phase windings, wherein the first C-phase winding is connected to the first neutral bus and the second C-phase winding is connected to the second neutral bus.

5. The electrical machine as recited in claim 1, further comprising a first sensor lead connected to the first voltage sensor and a second sensor lead connected to the second voltage sensor.

6. The electrical machine as recited in claim 1, wherein the first and second sensor leads have a small wire gauge relative to the A-phase and B-phase leads.

7. The electrical machine as recited in claim 1, wherein the controller is operably connected to the electrical machine and disposed in communication with the first and second voltage sensors.

8. The electrical machine as recited in claim 1, wherein the electrical machine is a dual-phase or a three-phase alternating current (AC) power electrical machine.

9. The electrical machine as recited in claim 1, wherein the electrical machine is a motor electrical machine.

10. The electrical machine as recited in claim 1, wherein the electrical machine is a generator electrical machine.

11. The electrical machine as recited in claim 1, wherein the electrical machine is motor/generator.

12. An electrical machine arrangement, comprising:
a motor electrical machine as recited in claim 1 including a motor controller including the inverter and the controller.

13. The electrical machine arrangement as recited in claim 12, further comprising a cabin air compressor or a nitrogen generation system connected to the motor.

14. The electrical machine arrangement as recited in claim 12, further comprising a phase lead connected to the first and second windings and a first sensor lead connected to the first voltage sensor and a second sensor lead connected to the second voltage sensor, wherein the first and second sensor leads have a wire gauge size that is smaller than that of the A-phase and B-phase leads.

15. The electrical machine as recited in claim 1, wherein the first and second voltage sensors are included in the stator.

16. The electrical machine as recited in claim 1, wherein power is removed from a subset of the A-phase and B-phase windings for identifying which of the A-phase and B-phase windings has the detected current phase imbalance.

17. The electrical machine as recited in claim 1, wherein the countermeasures include changing power to the identified A-phase winding or B-phase winding.

18. The electrical machine as recited in claim 1, wherein the first and second neutral busses are elongated buses, wherein the first and second voltage sensors are disposed at different locations along first and second neutral busses as the second ends of the second A-phase and B-phase windings.

19. A method of monitoring current imbalance in an electrical machine, comprising:
applying current to first and second A-phase windings and B-phase windings arranged electrically in parallel in a stator;
sensing an A-phase current along an A-phase lead connected between a first end of the first and second A-phase windings and an inverter;
sensing a B-phase current along a B-phase lead connected between a first end of the first and second B-phase windings and then inverter;
sensing, within the stator at a first neutral bus, a first voltage in the first neutral bus connected to the first A-phase winding at a second end of the first A-phase winding and further connected to the first B-phase winding at a second end of the first B-phase winding;
sensing, within the stator at a second neutral bus, a second voltage in the second neutral bus connected to the second A-phase winding at a second end of the second A-phase winding and further connected to the second B-phase winding at a second end of the second B-phase winding;
comparing the first and second voltages; and
monitoring for a total current phase imbalance based on a comparison of the currents measured in the A-phase and B-phase leads to a total phase current imbalance value;
when the total current phase flow is determined to be balanced, determining whether there is an imbalance of current phase flow per phase based on a comparison of a differential between the first and second voltages during operation of the stator and a voltage imbalance value; and
taking countermeasures for operation of the electrical machine based on a determination that there is an imbalance of the total current phase flow or an imbalance of the current phase flow per phase, wherein the countermeasures include de-rating or removing power applied to one or more of the of the A-phase and B-phase leads.

20. The method as recited in claim 19, wherein applying current to the first and second phase windings includes applying alternating current to the first and second phases with a common phase.

* * * * *